United States Patent [19]

Kohn

[11] 4,351,680

[45] Sep. 28, 1982

[54] TECHNIQUE FOR CONVERTING BALSA LOGS INTO CONTOURABLE PANELS

[75] Inventor: Jean Kohn, New York, N.Y.

[73] Assignee: Baltek Corporation, Northvale, N.J.

[21] Appl. No.: 930,740

[22] Filed: Aug. 3, 1978

Related U.S. Application Data

[63] Continuation-in-part of Ser. No. 894,047, Apr. 6, 1978, Pat. No. 4,208,369, which is a continuation-in-part of Ser. No. 860,617, Dec. 14, 1977, Pat. No. 4,122,878.

[51] Int. Cl.$^3$ .......................... B27K 3/15; B32B 5/18; B27D 1/00

[52] U.S. Cl. ...................................... 156/79; 144/345; 144/380; 156/250; 156/255; 156/296; 156/331.1; 428/304.4; 428/317.9; 264/158

[58] Field of Search ...................... 428/425, 541, 304.4, 428/317.9; 156/78, 79, 250, 254, 255, 296, 245, 331, 331.1; 264/139, 261, 263, 279; 144/309 D, 309 AC, 311, 314 R, 315 R, 316, 317, 327, 314A

[56] References Cited

U.S. PATENT DOCUMENTS 2,409,785 10/1946 Newmark et al. .................. 156/264
3,897,581 7/1975 Nakatsuka et al. .................. 428/44
3,963,064 6/1976 Hayes .......................... 144/309 AC
3,977,449 8/1976 Sadashige ........................ 144/314 R
3,981,338 9/1976 Jones .............................. 144/309 D

FOREIGN PATENT DOCUMENTS 963257 2/1975 Canada ................................ 144/316

*Primary Examiner*—Paul J. Thibodeau
*Attorney, Agent, or Firm*—Michael Ebert

[57] ABSTRACT

A high yield technique to convert normally-unusable round logs of balsa or other species of wood whose diameter is less than about 4 inches into large rectangular panels that are contourable.The raw logs are first peeled to expose the wood and are then cut into round pieces of a desired length. The pieces, after being kiln-dried, are stacked to form a dry assembly in which the pieces are separated from each other to define a matrix of interstitial spaces. The pieces in the assembly are then interlaminated in a mold by filling the matrix with an elastomeric plastic solution which, when cured, functions as an adhesive to provide an integrated stock block. The stock block is then divided into panels of the desired thickness, each panel being constituted by an array of round wood tiles joined together by elastomeric hinges, whereby the resultant panel is contourable and may be conformed to a curved surface.

5 Claims, 10 Drawing Figures

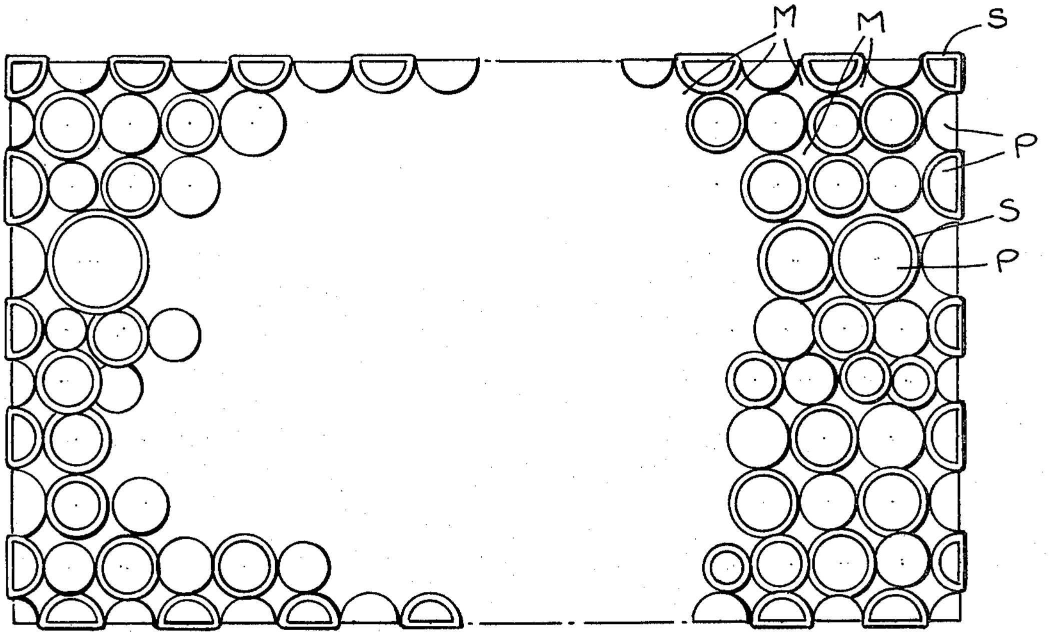
Fig. 5.
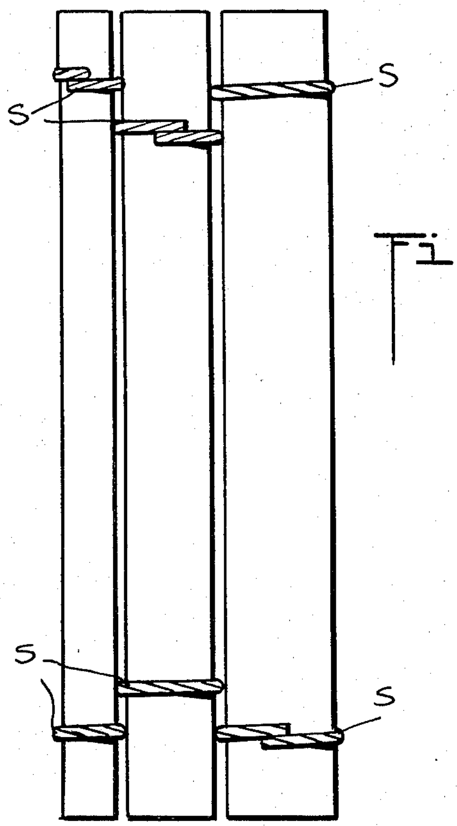
Fig. 3.
Fig. 8.
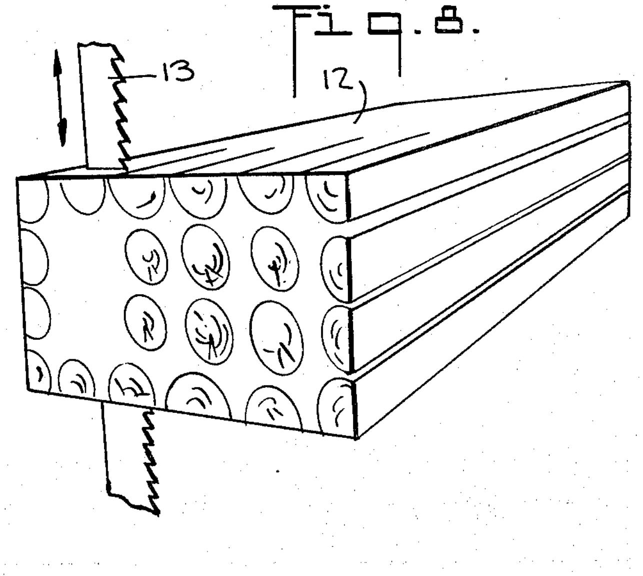

Fig. 6.
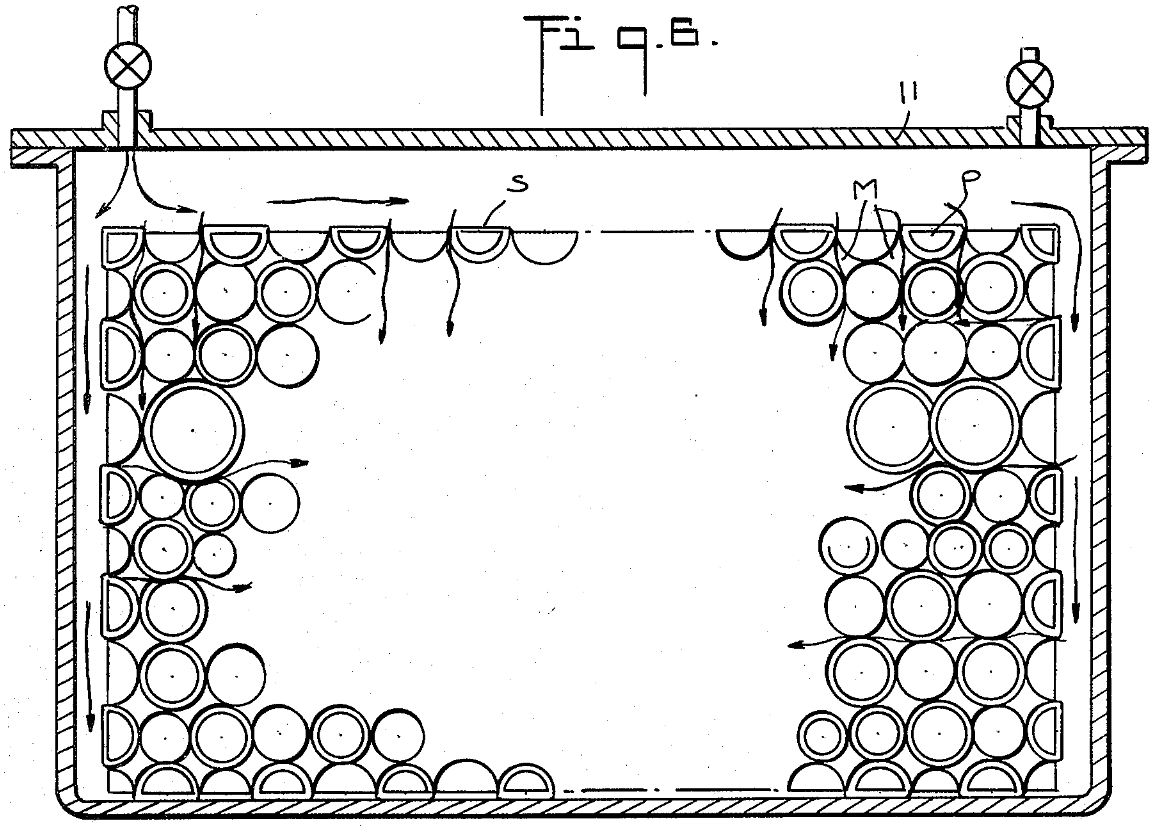
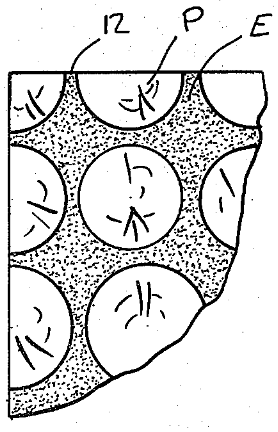
Fig. 7.
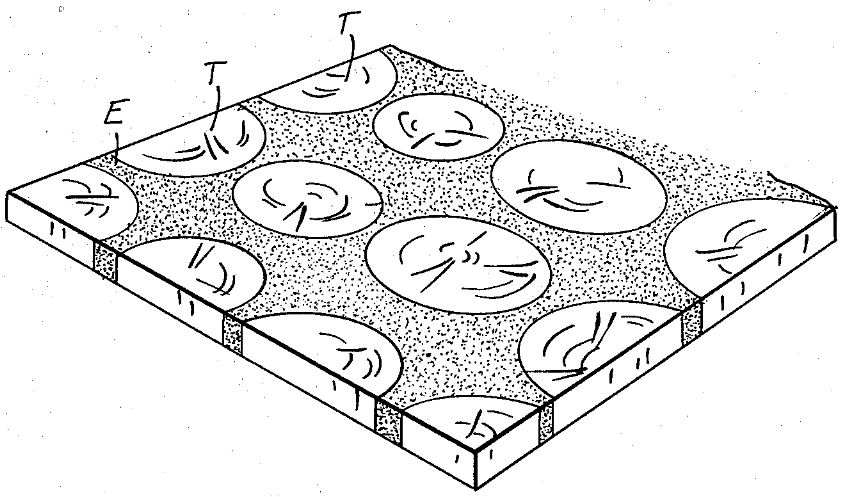
Fig. 8.
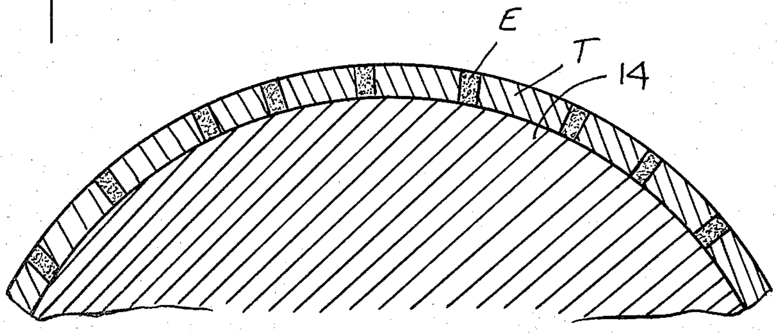
Fig. 10.

TECHNIQUE FOR CONVERTING BALSA LOGS INTO CONTOURABLE PANELS

RELATED APPLICATION

This application is a continuation-in-part of my copending application Ser. No. 894,047, filed Apr. 6, 1978, now U.S. Pat. No. 4,208,369 entitled "Improved Technique for Converting Balsa Logs into Panels," whose entire disclosure is incorporated herein by reference, said copending application being a continuation-in-part of an original application Ser. No. 860,617, filed Dec. 14, 1977, now U.S. Pat. No. 4,122,878.

BACKGROUND OF INVENTION

This invention relates generally to a technique for converting small round logs into lumber products, and more particularly to a technique in which logs of small diameter are cut into wood pieces that are stacked to form a block assembly in which the pieces are separated from each other to define a matrix of intersticial space, the pieces in the block assembly being interlaminated by injecting the matrix with an elastomeric plastic material to form an integrated stock block that is dividable into panels each constituted by wood tiles joined together by flexible hinges, whereby the resultant panel is contourable.

A technique in accordance with the invention, though applicable to various species of wood, is of particular value in connection with balsa wood derived from a tropical American tree (Ochroma pyramidale). Balsa wood has outstanding properties unique in the lumber field; for on the average, it weighs less than 9 pounds per cubic foot, this being 40% less than the lightest North American species. Its cell structure affords a combination of high rigidity and compressive and tensile strength superior to any composite or synthetic material of equal or higher density. While a technique in accordance with the invention will be described herein only in regard to balsa wood, it is to be understood that it is also applicable to other wood species.

The cost of balsa wood products has heretofore been keyed to the low yield obtainable when employing conventional techniques to convert balsa logs into usable products. The traditional conversion technique results in a low yield in that the amount of balsa convertible into usable lumber is usually less than half the total volume of wood in the log, the balance being wasted.

The economics of converting balsa logs into commercially-available lumber products must take into account a number of factors, such as growth time, kiln drying costs and the relationship of yield to tree diameter. The traditional conversion technique produces balsa lumber products from logs having a diameter of 12 inches or greater and inevitably results in products which are expensive. It not only requires about eight years before the trees can be harvested to produce logs of this size, but kiln costs are high and the yield is low in that a large percentage of the wood is wasted in the conversion process.

A marked improvement in the economics of converting balsa logs into usable products is gained by the technique disclosed in my prior U.S. Pat. No. 4,122,878, based on Ser. No. 860,617, filed Dec. 14, 1977, entitled "Technique for Converting Balsa Logs into Panels." In this patented technique, logs as small as four inches in diameter are radially cut into sectors having the same apex angle, each sector then being longitudinally sliced at its apex and arc to form a truncated piece having a trapezoidal cross-section, only a relatively small percentage of the wood being wasted. The pieces are thereafter fitted together in a complementary manner and interlaminated to form an integrated stock block which is dividable into panels.

The technique disclosed in my prior patent makes it possible to commercially exploit a broad range of balsa log diameters, running from small diameter logs cut from trees which take only 9 to 10 months to grow, to large diameter logs cut from more mature trees that take at least 5 to 8 years to grow. In this way, better use can be made of the available acreage. And because the logs are cut radially, the resultant area of the exposed surfaces is greater than that obtained with conventionally cut logs, thereby markedly reducing kiln drying time and its attendant costs. But even more important is the fact that the yield is exceptionally high; for, as compared to a traditional conversion which requires 60 logs of 12-inch diameter and 16 feet length to produce 1,000 board feet of balsa product, the technique disclosed in my prior patent yields the same amount of product from merely 20 such logs.

In my above-identified copending application Ser. No. 894,047, there is disclosed a technique for converting into lumber products logs of a diameter smaller than the smallest diameter which can be converted on a commercial scale by the technique disclosed in my prior patent; namely, logs cut from trees whose diameters lie in a range of about 1½ inches to 4 inches.

It must be borne in mind that balsa grows at a fairly rapid rate, and while it takes at least 8 years for a tree to mature, the diameter of the tree after only 3 months is about 2 inches, and after 9 months about 4 inches. Young balsa trees are generally thickly planted, but most of these die off after the first two years; for the laws of natural selection doom all but the fittest or best-placed trees which survive and grow to maturity.

With a technique of the type disclosed in my copending application, one can harvest and convert balsa trees after a few months, well before natural selection takes over, whereby the yield from a given acreage is enormously increased. Since a single acre can easily support thousands of young trees in the 2 to 4 inch diameter range, a technique which utilizes without waste the whole log derived from such trees yields much more usable wood product than was hitherto possible. Because it takes no more than about three months for a balsa tree to reach a diameter of 2 inches with a usable log length of 8 feet, about four thousand trees can be harvested per acre three times a year, each tree giving 2 board feet of usable cylindrical wood substance. Thus one acre will provide 24,000 board feet per year, and in eight years the same acre will yield 192,000 board feet, a quantity far greater than the yield derivable from the traditional technique.

In the high yield technique disclosed in my copending application for converting balsa logs in a range of diameters from about 1½ inches to 4 inches into rectangular panels and other lumber products, the raw logs are peeled to expose the wood, the peeled logs then being cut to a suitable length such as three feet to produce round pieces which are kiln-dried to a moisture content of about 12% or less. The dried pieces are then assembled into a block, the pieces being coated with a curable adhesive and being subjected to compression in orthogonal directions until the adhesive is cured and the pieces interlaminated to provide an integrated stock block. Finally, the stock block is divided into rectangular panels of the desired thickness.

In balsa wood panels of the type produced by the techniques disclosed in my prior patent and in my copending application, the panels are relatively rigid and may therefore be used in structural sandwich laminates created by bonding thin facings to the panels which then function as a core. Thus the Kohn et al. U.S. Pat. No. 3,325,037 discloses structural laminates of this type whose core is formed of end grain balsa wood, the laminates having an exceptionally high strength-to-weight ratio as well as excellent thermal insulation properties.

In contradistinction to such rigid panels, the concern of the present invention is with balsa wood panels that are inherently contourable; that is, with panels that can be conformed to curved surfaces for lamination thereto. No such panels have heretofore existed; for what has been known are contourable balsa wood blankets of the type disclosed in the Shook U.S. Pat. No. 3,540,967, composed of square individual balsa tiles attached to a fabric scrim which serves to interhinge the tiles whereby the blanket may be conformed to curved surfaces.

Such blankets, which are commercially available under the trademark "Contourkore," are useful in the construction of reinforced plastic boats and larger vessels, for they lend themselves to lamination between layers of reinforced fiberglass or other plastic material, thereby bringing about a distribution of weight favorable to high stability and buoyancy, as well as imparting stiffness to the structure.

In order to produce such contourable balsa wood blankets, one must start with a rigid panel of balsa wood and cut this panel into tiles which are then adhered to a common carrier or flexible scrim. This is a relatively complex and costly procedure.

SUMMARY OF INVENTION

In view of the foregoing, the main object of this invention is to provide a technique for converting into contourable panels, logs cut from trees or branches whose diameters lie in a range of 1½ inches to 4 inches.

More particularly, it is an object of this invention to provide a technique of the above type to produce contourable panels constituted by small round wood tiles which are interlaminated by elastomeric plastic material which functions to hinge the tiles together.

A significant advantage of the invention is that the panels resulting from the technique need not be cut into tiles and laminated to a scrim to render it contourable, as in prior techniques, for the panel itself is inherently contourable, thereby effecting significant production economies. Thus a technique in accordance with the present invention affords all of the high yield advantages flowing from the technique disclosed in my copending application in connection with the formation of rigid panels, plus the additional advantages gained by imparting inherent contourable properties to the panel.

Briefly stated, a technique in accordance with the invention for converting balsa logs in a range of diameters from about 1½ inches to 4 inches into contourable rectangular panels involves the steps of peeling the raw logs to expose the wood, cutting the peeled logs to a suitable length, such as three feet, to produce round pieces and kiln drying the round pieces to a moisture content of 12% or less.

The dried pieces are then fitted with separators and stacked to form an assembly in which the pieces separated from each other define a matrix of intersticial spaces. The pieces in the assembly are then interlaminated by injecting into the matrix an elastomeric plastic solution which when cured functions as an adhesive to provide an integrated stock block. The stock block is then divided into individual panels, each constituted by an array of round wood tiles joined together by elastomeric hinges, whereby the resultant panel is conformable to a curved surface.

OUTLINE OF DRAWINGS

For a better understanding of the invention as well as other objects and further features thereof, reference is made to the following detailed description to be read in conjunction with the accompanying drawings, wherein:

FIG. 3 shows a group of separated pieces;

FIG. 5 is an end view of the assembly;

FIG. 6 illustrates a mold for interlaminating the pieces in the assembly to produce an integrated block;

FIG. 7 shows a portion of the integrated block of round pieces after the matrix of intersticial spaces therein has been filed with synthetic elastomeric foam material;

FIG. 8 illustrates the manner of sawing the integrated block in one direction to produce rectangular contourable panels;

FIG. 9 is a perspective view of a portion of one of the contourable panels; and

FIG. 10 shows the panel conformed to a curved surface.

DESCRIPTION OF INVENTION

Figure 1:
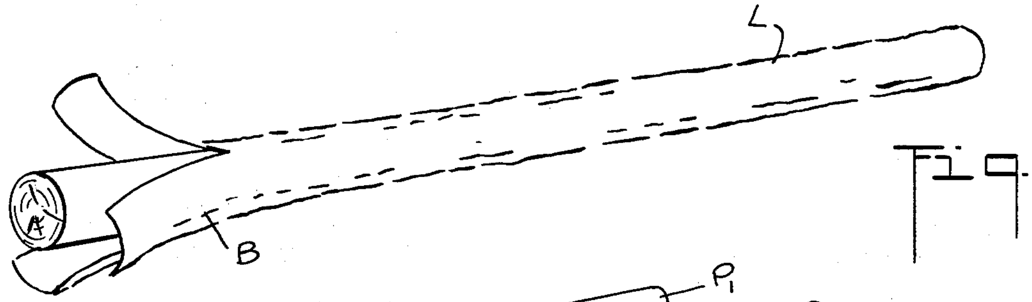
FIG. 1 shows a raw log of small diameter which is convertible into lumber products by a technique in accordance with the invention.

Referring now to FIG. 1, the first step in a technique in accordance with the invention is to harvest young balsa trees to obtain logs about 1½ inches to 4 inches in diameter, with trunk lengths running 6 feet to 8 feet and longer, depending on the tree. In addition to such young trees, use can also be made of the small diameter branches cut from the trees whose trunks are of much larger diameter. Such thin branches are ordinarily discarded as valueless.

The balsa log L, as shown in FIG. 1, has a thin bark and the next step is to peel off the bark B to expose the underlying wood. Since balsa grows only in tropical countries where the flow of sap is on a year-round basis rather than in the spring only, as in the northeastern part of the United States or in other temperate climates, peeling of the balsa logs in any season presents no problem and is easily accomplished.

Figure 2:
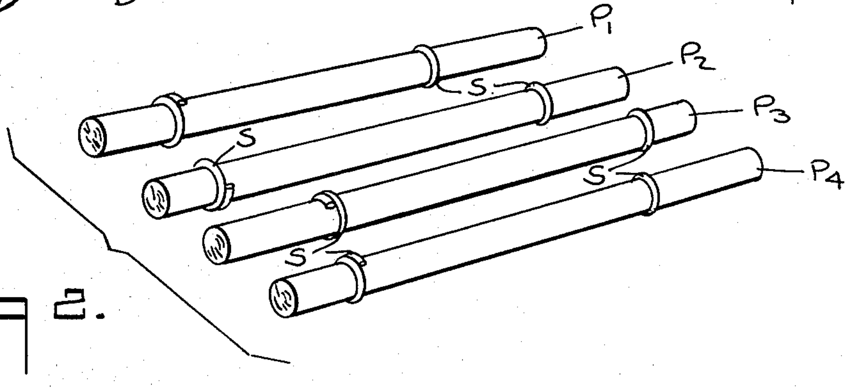
FIG. 2 illustrates the logs after they are peeled and cut to form round pieces of like length, which pieces are then provided with separators.

The peeled logs are then transversely cut, as shown in FIG. 2, to form round pieces $P_1$, $P_2$, $P_3$ etc., all of the same length, say, three or four feet. The diameters of the pieces depend, of course, on the diameters of the trees from which they are derived.

The round pieces are then kiln-dried in a conventional hot-air oven of the type used for lumber drying.

This procedure acts to reduce the moisture content of the pieces to 12 percent or less, this being standard practice in the lumber industry. It is to be noted that because the piece diameters are small, the interior region of the wood is close to the exposed surface and can therefore be quickly dried. The procedures for kiln-drying wood and recommended practices therefor are set forth in publication #188 of the U.S. Dept. of Agriculture, Forest Service, Forest Products Laboratory.

Figure 4:
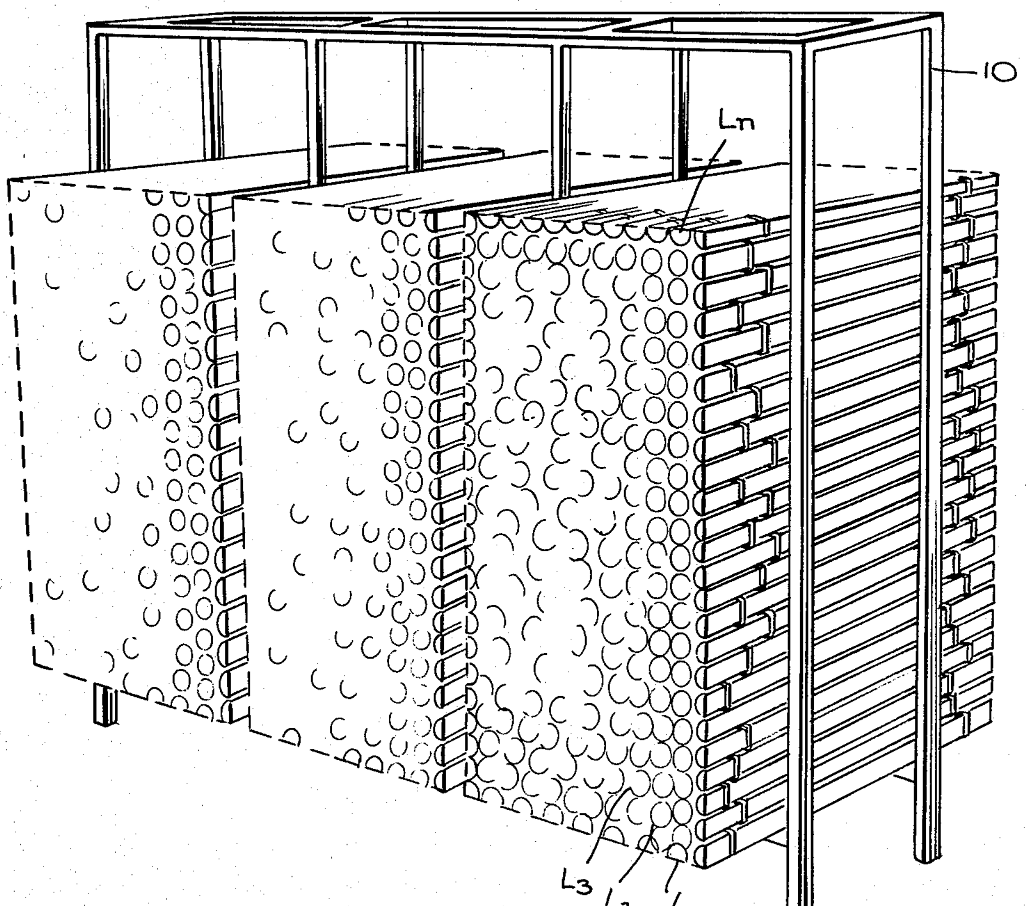
FIG. 4 is a perspective view of a frame for stacking the round pieces into an assembly.

The round pieces $P_1$, $P_2$, etc., are then sorted into pieces of substantially the same diameter. Thus all 1½ inch diameter pieces may be put in one pile, all 2 inch diameter pieces in a second pile, and so on. The next step, as shown in FIG. 4, is to assemble the pieces in superposed layers $L_1$, $L_2$, $L_3$ to $L_n$ to form a stack in which each layer is formed of pieces of substantially the same diameter. Thus if the round pieces are graded into six classes—small (1½″), medium-small (2″), medium (2½″), medium-large (3″), large (3½″) and extra-large (4″), each layer in the stack is constituted by pieces chosen from a given class. Thus the layers each have a substantially uniform height, although the heights may vary from layer to layer.

The kiln-dried pieces are then provided with separators to keep the pieces from touching each other. This can be accomplished by low-cost rope or yarn loops S which encircle the pieces adjacent their ends, the thickness or gauge of the loops being such as to provide the desired separation between adjacent pieces, as, for example, a quarter inch.

These stacked layers are temporarily held in place in a simple multi-stack frame 10 to form dry block assemblies. In practice, each assembly may be two feet wide and four feet tall or whatever other practical dimensions are dictated by the available equipment.

In order to form lateral faces or vertical block edges, the ends of each of the intermediate layers ($L_2$ etc.), as shown in FIG. 4, are terminated by round piece halves, the diametric faces forming a vertical edge. And in order to provide flat horizontal faces on the lowermost and uppermost layers of the stack ($L_1$ and $L_n$), these layers are formed by round piece halves, except at the ends where round piece quarters are provided.

As shown in FIG. 5, because the pieces in the dry block assembly are spaced from each other by separators, there is created a matrix M defined by the interstitial spaces between the pieces P. In order to form an integrated block, the assembly of pieces is transferred to a mold 11, as shown in FIG. 6, in which a solution of elastomeric synthetic plastic material, such as polyurethane foam, is injected into the matrix M to fill all of the interstitial spaces in the matrix. The assembly is kept in the mold until the foam has catalyzed and cured to adhere to the surface of the pieces, thereby interlaminating the pieces, as shown in FIG. 7, with elastomeric material E, to produce an integrated block 12.

Stock block 12 can now be divided, as shown in FIG. 8, into balsa panels of the desired thickness. This can be effected by a wide band saw 13 operating in the transverse direction of the block. The panels thus produced may then be sanded or planed to provide a more precise thickness and a better finish.

The resultant panel, as shown in FIG. 9, is composed of round wood tiles T which are joined together by elastomeric material E functioning as flexible hinges, making it possible to contour the panel to conform to a curved surface 14, as shown in FIG. 10.

While there has been shown and described a preferred embodiment of a technique for converting balsa logs into contourable panels in accordance with the invention, it will be appreciated that many changes and modifications may be made therein without, however, departing from the essential spirit thereof.

I claim:

1. A technique for producing contourable panels composed primarily of balsa wood and conformable to curved surfaces for lamination thereto comprising the steps of:

(A) cutting balsa trees whose trunk or branch diameters are in a range of about 1½ to 4 inches into raw logs having a length of at least about 6 feet;

(B) peeling the bark from the raw logs to expose the underlying wood;

(C) cutting the peeled logs into round balsa wood pieces of like length;

(D) kiln-drying the pieces to reduce the moisture content to about 12 percent;

(E) applying separators to the pieces to keep the pieces from touching each other;

(F) stacking the pieces to form a multi-layer assembly thereof in which the pieces lie in substantially parallel relation and are separated from each other to define a matrix of interstitial spaces;

(G) interlaminating the separated pieces in the assembly by injecting into the matrix a solution of an elastomeric synthetic plastic material which when cured adheres to the pieces to form an integrated stock block; and (H) dividing said block into panels, each constituted by round tiles hinged together by said elastomeric material, whereby the resultant panel is contourable to said curved surface.

2. A technique as set forth in claim 1, wherein said kiln-dried pieces which are of different diameter are sorted into classes, each having pieces of substantially the same diameter, each layer in said stack being made up of pieces from a given class whereby the layer has a substantially uniform height.

3. A technique as set forth in claim 1, wherein said injection is effected in a mold which is closed about said assembly, after which synthetic plastic material is introduced in catalyzed form to fill said matrix.

4. A technique as set forth in claim 3, wherein said plastic material is polyurethane foam.

5. A technique as set forth in claim 1, wherein said separators are formed by yarn rings encircling the ends of each piece.

* * * * *